United States Patent [19]
Stache et al.

[11] 3,895,008
[45] July 15, 1975

[54] DIGOXIGENIN-12-FORMIATE AND PROCESS FOR ITS MANUFACTURE
[75] Inventors: Ulrich Stache, Hofheim, Taunus; Werner Fritsch, Neuenhain, Taunus; Werner Haede, Hofheim, Taunus, all of Germany
[73] Assignee: Hoechst Aktiengesellschaft, Frankfurt am Main, Germany
[22] Filed: Nov. 16, 1973
[21] Appl. No.: 416,427

[30] Foreign Application Priority Data
Nov. 20, 1972 Germany.............................. 2256911

[52] U.S. Cl............................. 260/239.57; 424/241
[51] Int. Cl.² ..................................... C07C 173/02
[58] Field of Search ..................................
/Machine Searched Steroids

[56] References Cited
UNITED STATES PATENTS
3,211,761  10/1965  Wettstein et al................ 260/397.4

OTHER PUBLICATIONS
Rodds – Chemistry of Carbon Compounds, Vol. II, Part D, page 386 (1970).

Primary Examiner—Elbert L. Roberts
Attorney, Agent, or Firm—Curtis, Morris & Safford

[57] ABSTRACT
Digoxigenin-12-formiate prepared by a selective acylation of digoxigenin with a mixed anhydride of formic acid and acetic acid in the presence of a tertiary organic base. The product is suitable for the treatment of the disturbed circulatory system.

2 Claims, No Drawings

DIGOXIGENIN-12-FORMIATE AND PROCESS FOR ITS MANUFACTURE

The present invention relates to digoxigenin-12-formiate and to a process for the manufacture thereof.

It is known that digoxigenin can be selectively acetylated in the 12-position with acetic acid anhydride in pyridine. Owing to the vicinal position of the 12-acetate group thus obtained with regard to the angular 18-methyl group, it is, however, difficult to split off this acetate group by hydrolysis. For certain types of selective reactions with the 3-hydroxy group of digoxigenin, for example for glycosidation reactions, it would be advantageous if the protective group in the 12-position was easy to split off. under stringent alkaline hydrolysis conditions as required for splitting off the 12-acetate group, the structures which are relevant to a cardiotonic efficacy, such as the 14β-hydroxy group and the 17β-butenolide ring, are, moreover, chemically modified to an undesirable extent.

This invention now provides digoxigenin-12-formiate and a process for its manufacture, wherein digoxigenin is selectively acylated with a mixed anhydride of formic acid and acetic acid in the presence of a tertiary organic base to yield digoxigenin-12-formiate.

The process according to the invention proceeds according to the following reaction scheme:

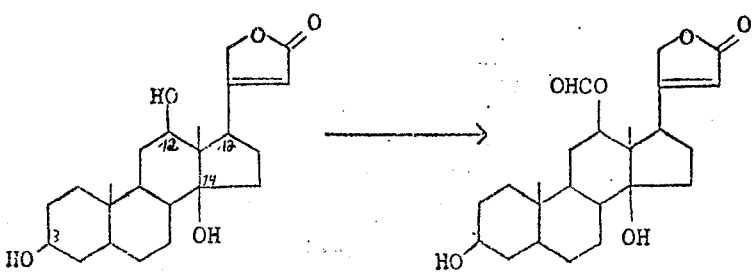

The present process starts with the preparation of the mixed anhydride of formic acid and acetic acid. At a temperature of from −20°C to +100°C, preferably from −10° to +25°C, this anhydride is then added to a solution of digoxigenin in a tertiary organic base, such as pyridine, quinoline or dimethylaniline, the mixed anhydride being advantageously used in a large excess. An especially favorable excess amount ranges from 5 to 10 molar equivalents of mixed anhydride. An inert organic solvent, such as dioxan, tetrahydrofuran, benzene, toluene or xylene, may be added to the reaction mixture.

The reaction mixture is kept at the temperature conditions indicated until the formylation reaction is complete. The course of the formylation reaction is checked by means of thin-layer chromatography. The $R_f$-value of digoxigenin-12-formiate clearly differs from that of digoxigenin-3,12-bis-formiate which is formed to a minor extent during the reaction, and from that of digoxigenin starting material. For example, the thin-layer chromatogram produced on silica gel in a system of benzene/methanol/acetone (80:20:5 parts by volume) upon single development and digestion with ethanolic p-toluene-sulfonic acid shows $R_f$-values for digoxigenin-3,12-bis-formiate of 0.47, for digoxigenin-12-formiate of 0.33 and for digoxigenin of 0.26.

It has proved to be advantageous to discontinue the formylation reaction as soon as thin-layer chromatogram shows the digoxigenin-3,12-bis-formiate just as an identifiable spot and the desired product according to the invention as a clearly visible spot. The reaction time required under these conditions, until the reaction is discontinued, generally ranges from 16 to 72 hours, but may also be shorter or longer.

When the reaction is complete, the reaction mixture is advantageously poured into water containing sodium chloride, whereupon a crystallized precipitate separates. The precipitate is conveniently extracted with an organic solvent, preferably methylene chloride, concentrated and the crude product thus obtained is then fractionated by chromatography, for example on aluminum oxide or silica gel, into the three components digoxigenin-12-formiate, digoxigenin-3,12-bis-formiate and digoxigenin. The pure digoxigenin-12-formiate obtained in a yield of 40 to 60 percent is a uniform product as the chromatogram shows.

The dioxigenin-3,12-bis-formiate obtained as a by-product can be subjected, after an easily performed hydrolysis, to another formylation reaction, together with unreacted digoxigenin. The overall yields of digoxigenin-12-formiate are, in fact, increased up to 80 percent by those repeated reactions.

The digoxigenin-12-formiate obtained according to the invention can be hydrolyzed both under mild alkaline and acid conditions to assure a quantitative yield of the corresponding compound having a free hydroxy group in 12-position. This also applies to the compounds which have been modified at the 3-hydroxy group upon formylation, especially to 3-glycosides and 3-ethers. In contradistinction thereto, the known digoxigenin-12-acetate and the compounds thereof which have been modified in 3-position, are not, or are only incompletely, hydrolyzed under these gentle conditions. It is, moreover, significant that digoxigenin-12-formiate as well as the 3-glycosides and 3-ethers thereof can be hydrolyzed gently so that the structures required for cardiotonic efficacy, such as the 14β-hydroxy group and the 17β-butenolide ring, are chemically not affected. In contradistinction thereto, the corresponding structures of the 12-acetate compounds are adversely affected under those stringent hydrolysis conditions required.

Digoxigenin-12-formiate may therefore be used as an especially advantageous intermediate product for the preparation of compounds which are modified at the 3-hydroxy group, for example of 3-glycosides and 3-ethers. Moreover, the product according to the invention has itself a strong positively inotropic effect and is therefore suitable for the treatment of a disturbed circulatory system.

Its activity can be demonstrated in tests on animals, for example in a test on an isolated atrium of a guinea pig's heart or by the potassium excretion test performed on this organ.

The following Examples illustrate the invention.

EXAMPLE 1

Digoxigenin-12-monoformiate 45 ml of a mixed anhydride of formic acid and acetic acid were added dropwise, at 0°C, while stirring, to a solution of 9 g of digoxigenin in 45 ml of absolute pyridine. (For preparing the said mixed anhydride a mixture of 15.2 ml of acetic acid anhydride and 34 ml of anhydrous formic acid had been heated to 50°C for 15 minutes; 45 ml thereof were then used). After the mixture had been allowed to stand for 49 hours at 19°–20°C, the thin-layer chromatogram showed the formation of an optimum amount of the product according to the invention. The reaction mixture was introduced dropwise into 2 l of water containing sodium chloride, whereupon crystals precipitated. They were extracted several times with methylene chloride, washed with water, dried, and the solvent was distilled off under reduced pressure. The residue obtained was chromatographed on $Al_2O_3$, Woelm, neutral, activity stage II (size of column: diameter: 3 cm, height: 26 cm). Elution was effected successively using 2 l of methylene chloride (fraction 1), 5 l of methylene chloride + 0.5 percent of methanol in fractions of 250 ml each (fractions 2 to 21), 2 l of methylene chloride + 2 percent of methanol in fractions of 500 ml each (fractions 22 to 25).

Fractions 1 to 5 yielded 1.7 g of digoxigenin-3,12-bis-formiate, fractions 6 to 19 yielded 5.1 g of digoxigenin-12-monoformiate and fractions 22 to 25 yielded 0.9 g of digoxigenin. Their identities were checked by means of thin-layer chromatography.

The digoxigenin-12-formiate which was a uniform product according to thin-layer chromatogram was crystallized from ether. Melting point: 258°–260°C. Characteristic infrared bands (in KBr): 3460, 1800, 1770, 1745, 1735, 1715 (broad), 1615, 1185, 1170, 1145, 1010 $cm^{-1}$.

EXAMPLE 2

Digoxigenin obtained by alkaline hydrolysis of digoxigenin-3,12-bis-formiate 150 mg of digoxigenin-3,12-bis-formiate were dissolved in 6 ml of methanol and a solution of 114 mg of potassium bicarbonate in 0.6 ml of water was added thereto. The mixture was refluxed for 25 minutes, poured onto 60 ml of water, extracted with methylene chloride, washed with water, dried and separated by distillation under reduced pressure. After recrystallization from alcohol/ether, 96 mg of digoxigenin were obtained, which corresponded to authentic material in its characteristic data.

EXAMPLE 3

Digoxigenin obtained by alkaline hydrolysis of digoxigenin-12-monoformiate 150 mg of digoxigenin-12-formiate were hydrolyzed and worked up as disclosed in Example 2. 102 mg of digoxigenin were obtained, which corresponded to authentic digoxigenin in its characteristic data.

Under the same hydrolysis conditions, the acetate group of digoxigenin-12-monoacetate was not split off.

EXAMPLE 4

Digoxigenin obtained by acid hydrolysis of digoxigenin-12-monoformiate 20 ml of water and 0.09 ml of concentrated hydrochloric acid were added to a solution of 100 mg of digoxigenin-12-formiate in 20 ml of ethanol and the mixture was refluxed for 30 minutes. The mixture was then neutralized by means of a sodium bicarbonate solution and concentrated under reduced pressure. About 5 ml of water were added to the residue and the precipitate was suction-filtered, washed and dried. After recrystallization from ethanol/ether, 64 mg of digoxigenin were obtained which corresponded to authentic material in its characteristic data. Under the same hydrolysis conditions, the acetate group of digoxigenin-12-monoacetate was not split off.

What is claimed is:
1. Digoxigenin-12-formiate.
2. A process for the manufacture of digoxigenin-12-formiate, which comprises acylating digoxigenin with a mixed anhydride of formic acid and acetic acid in the presence of a tertiary organic base.

* * * * *